United States Patent Office 3,824,115
Patented July 16, 1974

3,824,115
POLYVINYLIDENE FLUORIDE COMPOSITION
AND COATING THEREOF
Masahiro Segawa and Yukichika Kawakami, Iwaki, Japan, assignors to Kureha Kagaku Kogyo Kabushiki Kaisha, Tokyo-to, Japan
No Drawing. Original application June 3, 1970, Ser. No. 43,235, now abandoned. Divided and this application Oct. 20, 1971, Ser. No. 191,066
Claims priority, application Japan, June 12, 1969, 44/46,265
Int. Cl. B32b 15/08; B44d 1/16
U.S. Cl. 117—21                                    4 Claims

ABSTRACT OF THE DISCLOSURE

A metal surface is protectively powder coated with an undercoat and then with an overcoat of a polyvinylidene fluoride, the ratio of the thicknesses of the overcoat and the undercoat being from 0.25 to 4, the undercoat being a composition prepared by mixing from 10 to 100 parts by weight of at least one inorganic substance having resistance to acids and alkalis with 100 parts by weight of at least one polyvinylidene fluoride which has an inherent viscosity from 0.6 to 1.4 and is a homopolymer or a copolymer containing at least 90 mol percent of vinylidene fluoride.

This is a divisional application of applicant's copending application Ser. No. 43,235, filed June 3, 1970, now abandoned.

BACKGROUND OF THE INVENTION

This invention relates generally to polyvinylidene fluorides and more particularly to new and advanced polyvinylidene fluoride compositions in powder form for coating articles and to a new method for applying these compositions as coatings.

As is known, in addition to having excellent weathering property, polyvinylidene fluorides have high mechanical strength and can withstand heat up to high temperatures. Polyvinylidene fluorides, furthermore, have high resistance to deleterious effects of chemicals and inherently have very desirable characteristics as corrosion-resistant coating material for chemical equipment and as long-life coating material for protecting metal articles to be used in corrosive environments.

Moreover, a polyvinylidene fluoride has melting and decomposing temperatures which are separated by more than 150 degrees C. Accordingly, melt working of these fluorides can be easily carried out, whereby those of suitably selected degrees of polymerisation can be readily used in so-called powder coating wherein no use whatsoever is made of organic solvents and plasticisers, which are expensive and impose a fire hazard.

In actual practice, however, when a polyvinylidene fluoride is powder coated on a metal surface in accordance with the known art and thus exposed for a long time to a corrosive environment at a high temperature, the coating invariably exhibits defects such as blistering or swelling, floating, scaling, and peeling.

As one method of improving the adhesiveness of polyvinylidene fluorides with respect to metal surfaces, the utilisation of epoxy compounds in the undercoat has been proposed (as disclosed in U.S. Pat. No. 3,111,426, patented Nov. 19, 1963). This method, however, is not suitable in all cases since it tends to be complicated and troublesome, and, moreover, the mutual solubility between epoxy compounds and polyvinylidene fluorides is not good.

SUMMARY OF THE INVENTION

It is an object of the present invention to provide polyvinylidene fluorides of improved adhesiveness with respect to metal surfaces.

Another object of the invention is to provide polyvinylidene fluoride coatings on metal surfaces which coatings will not be accompanied by the above mentioned defects when used for long periods at high temperatures in corrosive environments.

Still another object of the invention, in another aspect thereof, is to provide a method of applying by powder coating polyvinylidene fluoride coatings of the above stated character, wherein polyvinylidene fluoride compositions according to the invention are used.

According to the present invention, briefly summarised, there is provided a method of powder coating on a metal surface an undercoat and then a polyvinylidene fluoride overcoat thereon, wherein the ratio of the thicknesses of the overcoat and undercoat is from 0.25:1 to 4:1, and the undercoat is prepared by mixing from 10 to 100 parts by weight of at least one inorganic substance having high resistance to acids and alkalis with 100 parts by weight of at least one polyvinylidene fluoride of an inherent viscosity of from 0.6 to 1.4, the polyvinylidene fluoride being a homopolymer or a copolymer containing at least 90 mol percent of vinylidene fluoride.

The nature, details, and utility of the invention will be more clearly apparent from the following detailed description beginning with general considerations and concluding with specific examples of practice illustrating preferred embodiments of the invention.

DETAILED DESCRIPTION

A composition of the invention, in general, is a material in powder form obtained by adding from 10 to 100 parts by weight of at least one inorganic substance to 100 parts by weight of a polyvinylidene fluoride prepared by polymerisation and mixing the resulting process materials.

The term "polyvinylidene fluoride" as herein used includes not only homopolymers of vinylidene fluoride but also copolymers having a content of 90 mol percent or more of vinylidene fluoride and having substantially equivalent properties. Examples of comonomers capable of undergoing copolymerisation with vinylidene fluoride are tetrafluoroethylene, hexafluoropropylene, chlorotrifluoroethylene and vinyl fluoride.

It is necessary that the polyvinylidene fluorides to be used according to the invention be of a degree of polymerisation which, expressed in terms of the intrinsic viscosity $\eta_i$, is from 0.6 to 1.4. The use of a polyvinylidene fluoride of an inherent viscosity less than 0.6 results in a coating film of low strength, whereas the use of one with $\eta_i$ greater than 1.4 causes difficulty in the formation of a continuous coating.

This inherent viscosity $\eta_i$ can be represented by the following equation:

$$\eta_i = \frac{1}{C} \ln \eta/\eta_0$$

where:

C is equal to 0.4;
ln is the symbol for natural logarithm;
$\eta$ is the viscosity at 30° C. of a solution in dimethyl formamide of a polymer of a concentration of 0.4 gramme/decilitre; and
$\eta_0$ is the viscosity at 30° C. of dimethyl formamide only.

For the aforementioned inorganic substance, a substance which has high resistance to water, acids, and alkalis as, for example, silica, graphite, molybdenum disulphide, and chromium oxide, can be used. When the quantity of this substance added to and admixed with 100 parts by weight of the polyvinylidene fluoride is less than 10 parts by weight, difficulty is encountered in achieving the objects of the invention, whereas, when this quantity is greater than 100 parts by weight, it is difficult to produce an even molten coating film. An even more preferable range of this quantity of the inorganic substance is from 30 to 80 parts by weight.

To prepare the composition of the invention, it is sufficient merely to mix mechanically the polyvinylidene fluoride in powder form and the inorganic substance in powder form, and for mixing these powders, an ordinary powder blender can be used directly without modification. Alternatively, a polyvinylidene fluoride powder in a foam wherein it contains the inorganic substance can be produced directly by polymerisation.

In either of these methods, the particle sizes of the powder should be from 50 to 325 mesh, preferably from 50 to 150 mesh, but there is no necessity for unifying the particle size.

The polyvinylidene fluoride composition in powder form according to the invention may be applied directly by powder coating on a metal surface. In some cases where necessary, however, the composition may be applied as an undercoat, and, as an overcoat thereover, the same composition or a substance such as a powder of only polyvinylidene fluoride may be applied. In applying such a double coat, the proportions of the coating film thicknesses are so selected that the thickness of the overcoat is 4 or less times, preferably from 0.25 to 4 times, the thickness of the undercoat, and the total thickness is from 0.5 to 2.0 mm.

When the overcoat thickness is made greater than 4 times the undercoat thickness, it becomes difficult to avoid defects when the coating is used at high temperatures. On the other hand, this proportion is preferably 0.25 times or more in consideration of the probable wear during use.

A specific example of the procedure of coating a metal surface with a polyvinylidene fluoride composition according to the invention will now be described.

The surface to be coated of a metal material or article is first prepared by mechanical removal of corrosion by sand-blasting or shot-blasting or by chemical treatment. Next, the metal material or article is placed in a furnace and preheated to a temperature of from 200 to 350 degrees C. The metal article thus preheated is then taken out of the furnace, and a polyvinylidene fluoride composition powder is deposited on the surface thereof to be coated by a technique such as fluidised-bed dipping, powder spraying, or electrostatic powder spraying.

While the polyvinylidene fluoride powder thus deposited begins to melt, it is best to return the article to the furnace and continue the heating again so as to form a continuous film. When a molten continuous film has been formed, the article is again taken out of the furnace and coated with powder caused to adhere thereto.

By repeating this procedure, an undercoat and an overcoat are successively applied, but each of these coats may be applied in two or more steps. In one technique of applying the undercoat in two or more steps, the quantity of the inorganic substance is progressively reduced.

Sagging or drooping of the molten film during the coating process can be effectively suppressed by a heating procedure wherein the heating temperature is reduced in accordance with the number of coat layers applied.

When the desired coating thickness has been attained, the article thus coated is subjected to a cooling process.

In the case where the overcoat is formed with a coating of only polyvinylidene fluoride powder, it is possible to produce a continuous and thin coating without gaps or pinholes, but in some cases; depending on the necessity, other substances such as pigments, fillers, and nucleating agent may be added.

In order to indicate still more fully the nature and utility of the invention, the following examples of specific practice constituting preferred embodiments of the invention and results are set forth, it being understood that these examples are presented as illustrative only, and that they are not intended to limit the scope of the invention.

EXAMPLE 1

One surface of a steel disk of 100-mm. diameter and 3-mm. thickness, which had been sand-blasted to remove rust, was powder coated with a polyvinylidene fluoride powder.

Separately, polyvinylidene fluoride powder prepared by suspension polymerisation and having an intrinsic viscosity $\eta_i$ of 1.13 and a particle size of from 60 to 200 mesh was mixed with silica sand of a particle size of from 150 to 325 mesh in varying proportions to prepare eight mixtures of respectively different mixture ratios. These eight mixtures were used to powder coat single surfaces of eight respective steel disks in a furnace at 280 degrees C., each coating being of a thickness of 0.4 mm.

Next, by means of the furnace at 250 degrees C., the eight disks were further coated with a 0.4-mm. layer of powder of only the polyvinylidene fluoride to form on each a coating of a total thickness of 0.8 mm. The disks where then left in atmospheric air to cool. The disks thus coated and cooled were then heated again to 185 degrees C. and thus left for 2 hours, being thereafter cooled in atmospheric air.

As a result, a polyvinylidene fluoride coating having a glass-like lustre was found to have formed on each of the steel disks.

The coating surfaces of the eight disks thus coated were exposed to steam at 100 degrees C. until swelling or blistering occurred in each case. The relationship between the kind of undercoat and the length of time of exposure before blistering occurred is indicated in Table 1.

TABLE 1

| Undercoat (polyvinylidene fluoride:silica sand): | Time of exposure to steam before occurrence of blistering (hours) |
|---|---|
| 100:0 | 7. |
| 100:5 | 10. |
| 100:10 | 18. |
| 100:20 | 24. |
| 100:40 | More than 480. |
| 100:60 | More than 480. |
| 100:80 | More than 480. |
| 100:100 | More than 480. |
| 100:120 | Molten continuous film was not formed. |

EXAMPLE 2

A mixture prepared by mixing 50 parts by weight of graphite of a particle size of from 200 to 325 mesh with 100 parts by weight of a polyvinylidene fluoride powder similar to that specified in Example 1 was used as an undercoat material, and a powder of only the polyvinylidene fluoride was used as an overcoat material in coating single surfaces of five steel plates with the same total coating thickness of 1 mm. of respectively different ratios of thicknesses of the undercoat and overcoat.

The coating surfaces thus formed were exposed to steam at 100 degrees C. The relationship between the above mentioned ratio of thicknesses and the time of exposure to the steam before swelling or blistering occurred was as indicated in Table 2.

TABLE 2

| Undercoat thickness (mm.) | Overcoat thickness (mm.) | Time of exposure to steam before occurrence of blistering (hours) |
|---|---|---|
| 0.1 | 0.9 | 10. |
| 0.2 | 0.8 | 48. |
| 0.4 | 0.6 | 240. |
| 0.6 | 0.4 | More than 480. |
| 0.8 | 0.2 | Do. |

EXAMPLE 3

Five different coating mixtures were prepared by mixing 50 parts by weight of the same graphite powder specified in Example 2 with 100 parts by weight of each of four polyvinylidene fluoride powders respectively having four different inherent viscosities $\eta_i$. The four coating mixtures thus prepared were powder coated on single surfaces of respective steel disks similar to that specified in Example 2 in a furnace at 300 degrees C.

It was found that the magnitude of the inherent viscosity $\eta_i$ has an influence on the case or difficulty with which a molten continuous film can be formed and on resistance to impact of the coating obtained. These relationships are indicated in Table 3.

TABLE 3

| $\eta_i$ of polyvinylidene fluoride | Formation of molten continuous film | Resistance to hammer impact |
| --- | --- | --- |
| 0.5 | Molten viscosity too low | Brittle. |
| 0.8 | Good | Good. |
| 1.2 | do | Do. |
| 1.4 | Slightly difficult | Do. |
| 1.6 | Difficult | |

EXAMPLE 4

A vinylidene fluoride copolymer of 95 percent by weight of vinylidene fluoride and 5 percent of tetrafluoroethylene was prepared and found to have an inherent viscosity $\eta_i$ of 1.32 and a particle size range of from 60 to 250 mesh.

A mixture of 80 parts by weight of molybdenum disulfide of 325-mesh particle size and 100 parts by weight of the copolymer powder thus prepared was applied as an undercoat on one surface of a steel disk as specified in Example 1, and only the copolymer was applied thereon as an overcoat. The thickness of the undercoat layer was 0.8 mm., while that of the overcoat was 0.6 mm., the total coating thickness being 1.4 mm.

The surface of the coating thus formed was exposed continuously to steam at 100 degrees C. for a period exceeding 480 hours, but no swelling or blistering was observable.

EXAMPLE 5

Inner wall surface of a pipe of a nominal size of 100 A. and 3-metre length was powder coated with an undercoat and an overcoat of the compositions and thicknesses shown in Table 4.

TABLE 4

| Ingredient/thickness: | Undercoat | Overcoat |
| --- | --- | --- |
| Vinylidene fluoride, ($\eta_i$=1.09, particle size 60-200 mesh) (parts by wt.) | 100 | 100 |
| Silica sand, (particle size 150-325 mesh) (parts by wt.) | 45 | 0 |
| Chrominum oxide, (particle size 150-325 mesh) (parts by wt.) | 5 | 0 |
| Film thickness (mm.) | 0.4 | 0.4 |

The pipe thus coated internally was incorporated in a process system and used to conduct a flow of 20-percent hydrochloric acid at a temperature of 110 degrees C. After one year of continuous service in this manner, no changes or abnormalities were observable in this pipe.

In contrast, a similar pipe powder coated with only a 0.8-mm. overcoat, without application of an undercoat, and similarly installed and used was found, upon examination after two months, to have a coating surface with parts in raised or distended state.

What we claim is:

1. A method for powder coating a metal surface with polyvinylidene fluoride which consists essentially of: undercoating the surface of the metal with a polyvinylidene fluoride powder composition obtained by admixing 10 to 100 parts by weight of at least one inorganic powder selected from the group consisting of silica, graphite, molybdenum disulfite, and chromium disulfite, and chromium oxide to 100 parts by weight of polyvinylidene fluoride powder having an inherent viscosity of 0.4 to 1.4; and then overcoating said undercoated surface with said polyvinylidene fluoride powder alone, the ratio of the film thickness of the undercoat to that of the overcoat being from 0.25:1 to 4:1.

2. The method according to claim 1, in which the particle size of said polyvinylidene fluoride powder and inorganic powder ranges from 50 to 325 meshes.

3. The method according to claim 1, in which said polyvinylidene fluoride is a homopolymer.

4. The method according to claim 1, in which said polyvinylidene fluoride is a copolymer consisting of at least 90 mol percent of vinylidene fluoride and a monomer selected from the group consisting of tetrafluoroethylene, hexafluoro-propyrene, chlorotrifluoro-ethylene, and vinyl fluoride.

References Cited

UNITED STATES PATENTS

| | | | |
| --- | --- | --- | --- |
| 2,979,418 | 4/1961 | Dipner | 117—132 CF |
| 3,692,558 | 9/1972 | Werner | 117—132 CF |
| 3,340,222 | 9/1967 | Fang | 117—132 CF |
| 2,843,502 | 7/1958 | Fay | 117—132 CF |
| 3,351,504 | 11/1967 | De Hart | 117—21 |
| 3,240,744 | 3/1966 | Kusiak | 117—21 |
| 3,609,217 | 9/1971 | Gaja | 117—132 CF |
| 3,342,667 | 9/1967 | Berlinghot | 117—132 CF |
| 3,655,426 | 4/1972 | Fuchs | 117—132 CF |
| 2,995,462 | 8/1961 | Mitchell et al. | 117—132 CF |
| 2,689,380 | 9/1954 | Tait | 117—21 |
| 3,240,744 | 3/1966 | Kusiak | 260—31.8 |
| 2,844,489 | 7/1958 | Gemmer | 117—20 |
| 3,098,054 | 7/1963 | Rosenberg | 260—41 |
| 2,909,443 | 10/1959 | Wolinski | 117—16 |

OTHER REFERENCES

Modern Plastic Encyclopedia, 1968, September 1967, vol. 45, No. 1A, pp. 154, 159–160.

Payne, H. F.: Organic Coating Tech., vol. II, John Wiley & Sons, Inc. New York, 1961, p. 787.

WILLIAM D. MARTIN, Primary Examiner

W. R. TRENOR, Assistant Examiner

U.S. Cl. X.R.

117—75, 132 CF; 148—6.14 R; 260—41 R